(12) United States Patent
Wong et al.

(10) Patent No.: US 12,130,828 B2
(45) Date of Patent: Oct. 29, 2024

(54) MANAGING QUERY MODELS BASED ON SHARED OBJECTS

(71) Applicant: Business Objects Software Ltd., Dublin (IE)

(72) Inventors: Justin Wong, Burnaby (CA); Rui Liu, Vancouver (CA); Clarence Chuahuico, Port Coquitlam (CA); Semuel Kadarusman, Burnaby (CA); Veljko Jovanovic, Vancouver (CA)

(73) Assignee: BUSINESS OBJECTS SOFTWARE LTD, Dublin (IE)

( * ) Notice: Subject to any disclaimer, the term of this patent is extended or adjusted under 35 U.S.C. 154(b) by 112 days.

(21) Appl. No.: 17/529,006

(22) Filed: Nov. 17, 2021

(65) Prior Publication Data

US 2023/0062012 A1     Mar. 2, 2023

Related U.S. Application Data

(60) Provisional application No. 63/237,927, filed on Aug. 27, 2021.

(51) Int. Cl.
*G06F 16/248* (2019.01)
*G06F 16/242* (2019.01)
*G06F 16/25* (2019.01)
*G06F 16/26* (2019.01)

(52) U.S. Cl.
CPC .......... *G06F 16/248* (2019.01); *G06F 16/242* (2019.01); *G06F 16/258* (2019.01); *G06F 16/26* (2019.01)

(58) Field of Classification Search
None
See application file for complete search history.

(56) References Cited

U.S. PATENT DOCUMENTS

| | | | | |
|---|---|---|---|---|
| 2002/0180777 | A1* | 12/2002 | Kusumoto | G06F 9/451 715/733 |
| 2003/0115194 | A1* | 6/2003 | Pitts | G06F 16/24534 |
| 2003/0163479 | A1* | 8/2003 | Mathews | G06F 16/289 707/999.102 |
| 2011/0040802 | A1* | 2/2011 | Bonatti | G06Q 10/10 707/E17.014 |
| 2018/0173754 | A1* | 6/2018 | Kumar | G06F 16/24535 |
| 2020/0257660 | A1* | 8/2020 | Ainsley | G06F 16/10 |
| 2021/0390083 | A1* | 12/2021 | Chu | G06F 9/546 |
| 2022/0043818 | A1* | 2/2022 | Quast | G06F 16/24539 |

* cited by examiner

*Primary Examiner* — Dawaune A Conyers
(74) *Attorney, Agent, or Firm* — Fountainhead Law Group, PC

(57) ABSTRACT

Some embodiments provide a program that generates a first query for a first visualization based on a first query model associated with the first visualization. The first query model includes a first reference to a shared object. The program further sends the first query to a computing system. The program also receives from the computing system a first set of data. The program further generates the first visualization based on the first set of data. The program also generates a second query for a second visualization based on a second query model associated with the second visualization. The second query model includes a second reference to the shared object. The program further sends the second query to the computing system. The program also receives from the computing system a second set of data. The program further generates the second visualization based on the second set of data.

20 Claims, 9 Drawing Sheets

MANAGING QUERY MODELS BASED ON SHARED OBJECTS

BACKGROUND

Many software applications utilize data that is stored in databases. In order to obtain such data, a software application typically generates a query for the desired data and sends the query to the database for processing. In return, the software application receives the requested data. The data that the software application needs may change often during the operation of the software application. As such, the software application may need to manage its queries so that it can obtain the correct data at the right time.

SUMMARY

In some embodiments, some embodiments, a non-transitory machine-readable medium stores a program executable by at least one processing unit of a device. The program generates a first query for a first visualization based on a first query model associated with the first visualization. The first query model includes a first reference to a shared object. The program further sends the first query to a computing system. In response to the first query, the program also receives from the computing system a first set of data included in a data model managed by the computing system. The program further generates the first visualization based on the first set of data. The program also generates a second query for a second visualization based on a second query model associated with the second visualization. The second query model includes a second reference to the shared object. The program further sends the second query to the computing system. In response to the second query, the program also receives from the computing system a second set of data included in the data model managed by the computing system. The program further generates the second visualization based on the second set of data.

In some embodiments, generating the first query may include transforming the first query model into a runtime version of the first query model. Transforming the first query model into the runtime version of the first query model may include, based on the first reference, retrieving the shared object and generating a set of transient objects based on the shared object. Sending the first query to the computing system may include sending the runtime version of the first query model to the computing system.

In some embodiments, the program may further provide a graphical user interface (GUI) for defining shared objects and receive, through the GUI, a definition of the shared object. The program may further serialize the first query model for storage by converting the first query model into a format configured to be stored in a storage. Converting the first query model may include determining a set of identifiers (IDs) for collectively identifying the shared object model and including the set of IDs in the first query model formatted according to the format. The shared object may be a calculation object configured to derive data based on data included in the data model.

In some embodiments, a method generates a first query for a first visualization based on a first query model associated with the first visualization. The first query model includes a first reference to a shared object. The method further sends the first query to a computing system. In response to the first query, the method also receives from the computing system a first set of data included in a data model managed by the computing system. The method further generates the first visualization based on the first set of data. The method also generates a second query for a second visualization based on a second query model associated with the second visualization. The second query model includes a second reference to the shared object. The method further sends the second query to the computing system. In response to the second query, the method also receives from the computing system a second set of data included in the data model managed by the computing system. The method further generates the second visualization based on the second set of data.

In some embodiments, generating the first query may include transforming the first query model into a runtime version of the first query model. Transforming the first query model into the runtime version of the first query model may include, based on the first reference, retrieving the shared object and generate a set of transient objects based on the shared object. Sending the first query to the computing system may include sending the runtime version of the first query model to the computing system.

In some embodiments, the method may further provide a graphical user interface (GUI) for defining shared objects and receive, through the GUI, a definition of the shared object. The method may further serialize the first query model for storage by converting the first query model into a format configured to be stored in a storage. Converting the first query model may include determining a set of identifiers (IDs) for collectively identifying the shared object model and including the set of IDs in the first query model formatted according to the format. The shared object may be a calculation object configured to derive data based on data included in the data model.

In some embodiments, a system includes a set of processing units and a non-transitory machine-readable medium that stores instructions. The instructions cause at least one processing unit to generate a first query for a first visualization based on a first query model associated with the first visualization. The first query model includes a first reference to a shared object. The instructions further cause the at least one processing unit to send the first query to a computing system. In response to the first query, the instructions also cause the at least one processing unit to receive from the computing system a first set of data included in a data model managed by the computing system. The instructions further cause the at least one processing unit to generate the first visualization based on the first set of data. The instructions also cause the at least one processing unit to generate a second query for a second visualization based on a second query model associated with the second visualization. The second query model includes a second reference to the shared object. The instructions further cause the at least one processing unit to send the second query to the computing system. In response to the second query, the instructions also cause the at least one processing unit to receive from the computing system a second set of data included in the data model managed by the computing system. The instructions further cause the at least one processing unit to generate the second visualization based on the second set of data.

In some embodiments, generating the first query may include transforming the first query model into a runtime version of the first query model. Transforming the first query model into the runtime version of the first query model may include, based on the first reference, retrieving the shared object and generating a set of transient objects based on the shared object. Sending the first query to the computing system may include sending the runtime version of the first query model to the computing system.

In some embodiments, the instructions may further cause the at least one processing unit to provide a graphical user interface (GUI) for defining shared objects and receive, through the GUI, a definition of the shared object. The instructions may further cause the at least one processing unit to serialize the first query model for storage by converting the first query model into a format configured to be stored in a storage. Converting the first query model may include determining a set of identifiers (IDs) for collectively identifying the shared object model and including the set of IDs in the first query model formatted according to the format.

The following detailed description and accompanying drawings provide a better understanding of the nature and advantages of various embodiments of the present disclosure.

DETAILED DESCRIPTION

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for managing query models based on shared objects. In some embodiments, a client device provides visualizations (e.g., charts, tables, etc.) for a user of the client device. To obtain the data for the visualizations, the client device queries data from a data model managed by a computing system. Each visualization has a query management component with which it is associated that manages query models representing queries for data for the visualization. The query models associated with different visualizations may use the same object (also referred to as a shared object) that specifies data to be used for the visualizations. Then, the query management component of each visualization generates a query based on its respective query model and sends the query to the computing system. When the visualizations receive the requested data from the computing system, they use the received data to generate the visualizations.

The techniques described in the present application provide a number of benefits and advantages over conventional methods for managing query models. For instance, using a shared object for different visualizations decreases the amount of code and storage space utilized by the client device. Conventional methods may employ a separate and distinct objects for each visualization regardless of whether the objects are the same and/or define the same data to be used. Moreover, using a shared objects in the manner described herein provides one central source of truth. Therefore, changes only need to be made to a single shared object as opposed to attempting to maintain states for different copies of the same object on all query models using the object.

Figure 1:
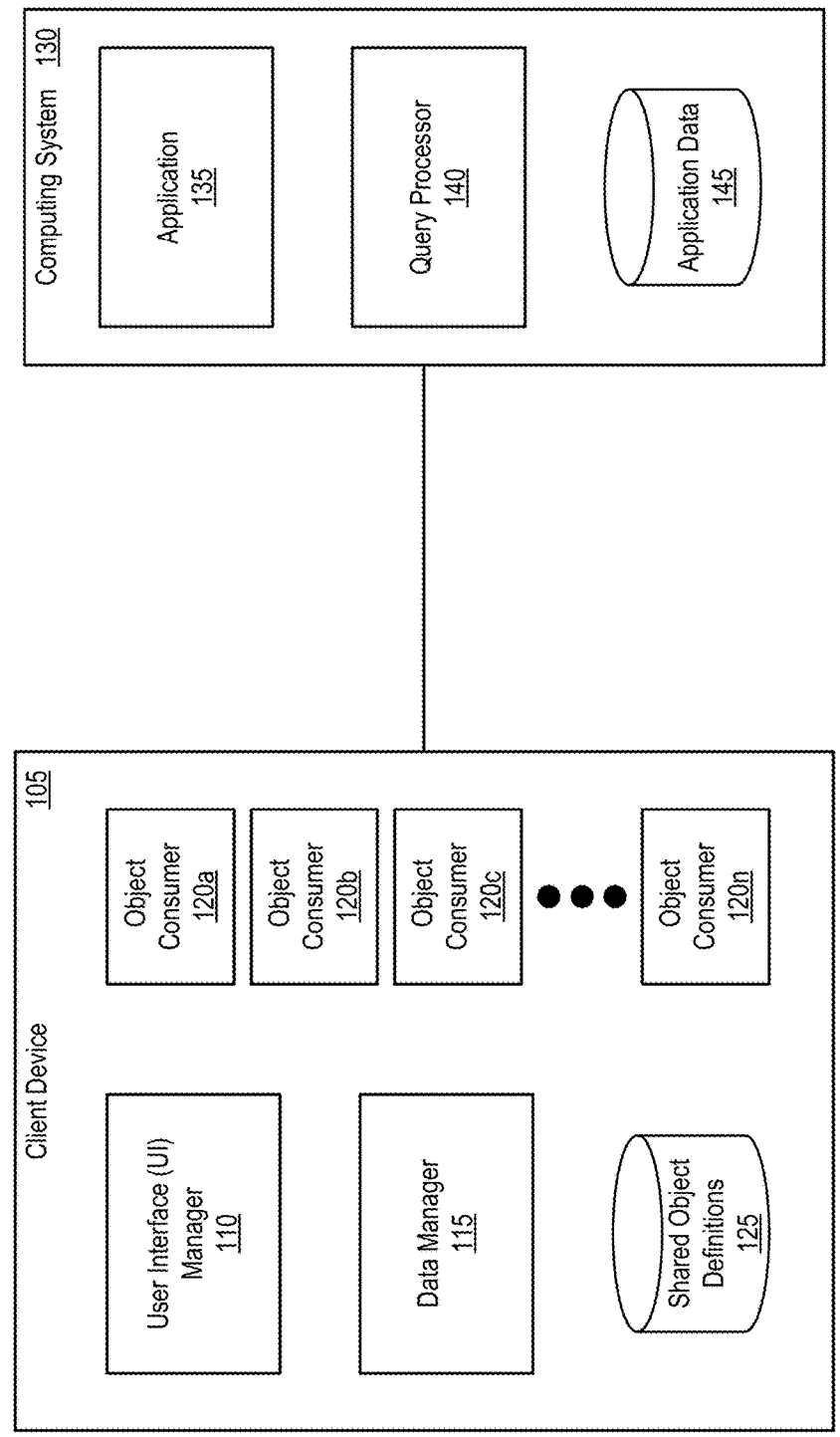
FIG. 1 illustrates a system for managing query models based on shared objects according to some embodiments.

FIG. 1 illustrates a system 100 for managing query models based on shared objects according to some embodiments. As shown, system 100 includes client device 105 and computing system 130. FIG. 1 depicts client device 105 including user interface (UI) manager 110, data manager 115, object consumers 120a-n, and shared object definitions storage 125. While FIG. 1 shows one client device, one of ordinary skill in the art will appreciate that system 100 can include any number of additional client devices that are configured the same as or similar to client device 105.

Shared object definitions storage 125 is configured to stored shared objects. In some embodiments, a shared object is configured to specify data that is to be used for a visualization. In some embodiments, shared object definitions storage 125 is implemented in a single physical storage while, in other embodiments, shared object definitions storage 125 may be implemented across several physical storages. While FIG. 1 shows shared object definitions storage 125 as part of client device 105, one of ordinary skill in the art will appreciate that configuration shared object definitions storage 125 may be external to client device 105 in some embodiments.

UI manager 110 is responsible for providing graphical user interfaces (GUIs) for interacting with client device 105. For example, UI manager 110 can provide a GUI for defining shared objects that specify data to be used for visualizations. Upon receiving a definition of a shared object through such a GUI, UI manager 110 sends the shared object definition to data manager 115. Different types of shared objects can be defined in different embodiments. For instance, one type of shared object is a calculation object. In some embodiments, a calculation object defines a measure whose values are derived from data (e.g., measures and/or dimensions) in a data model. The measure defined by a calculation object is not included in the data model from which values are derived. Stated differently, the measure defined by a calculation object is does not exist in a data model managed by computing system 130 but, rather, is created on the fly based on data in a data model managed by computing system 130. Another type of shared object is a threshold object. In some embodiments, a threshold object specifies a set of rules associated with a measure in a data model. Each rule in the set of rules can specify to flag values that pass a particular threshold value. In some embodiments, a shared object is an object stored on client device 105 and not stored on computing system 130.

As another example, UI manager 110 may provide a GUI for receiving modifications to shared objects. When UI manager 110 receives a modification to a shared object via this GUI, UI manager 110 sends the modification to data manager 115. As yet another example, UI manager 110 can provide a GUI for presenting visualizations (e.g., on a display of client device 105). In some cases, UI manager 110 may receive a request to view a particular GUI that includes visualizations. In response to the request, UI manager 110 can send computing system a request for a UI definition that defines the set of visualizations in the GUI. After receiving the UI definition from computing system 130 (e.g., application 135), UI manager 110 generates an object consumer 120 for each visualization specified in the UI definition. Then, UI manager 110 instructs the object consumers 120 associated with each visualization to generate their respective visualizations. Once UI manager 110 receives the visualizations from the object consumers 120, UI manager 110 presents them in a GUI. In some instances, UI manager 110 may want to present, in a particular GUI, certain or all measures and/or dimensions in a data model. In some such instances, UI manager 110 sends data manager 115 a request for the certain or all measures and/or dimensions. Upon receiving the requested measures and/or dimensions, UI manager 110 presents them via the GUI.

Figure 2:
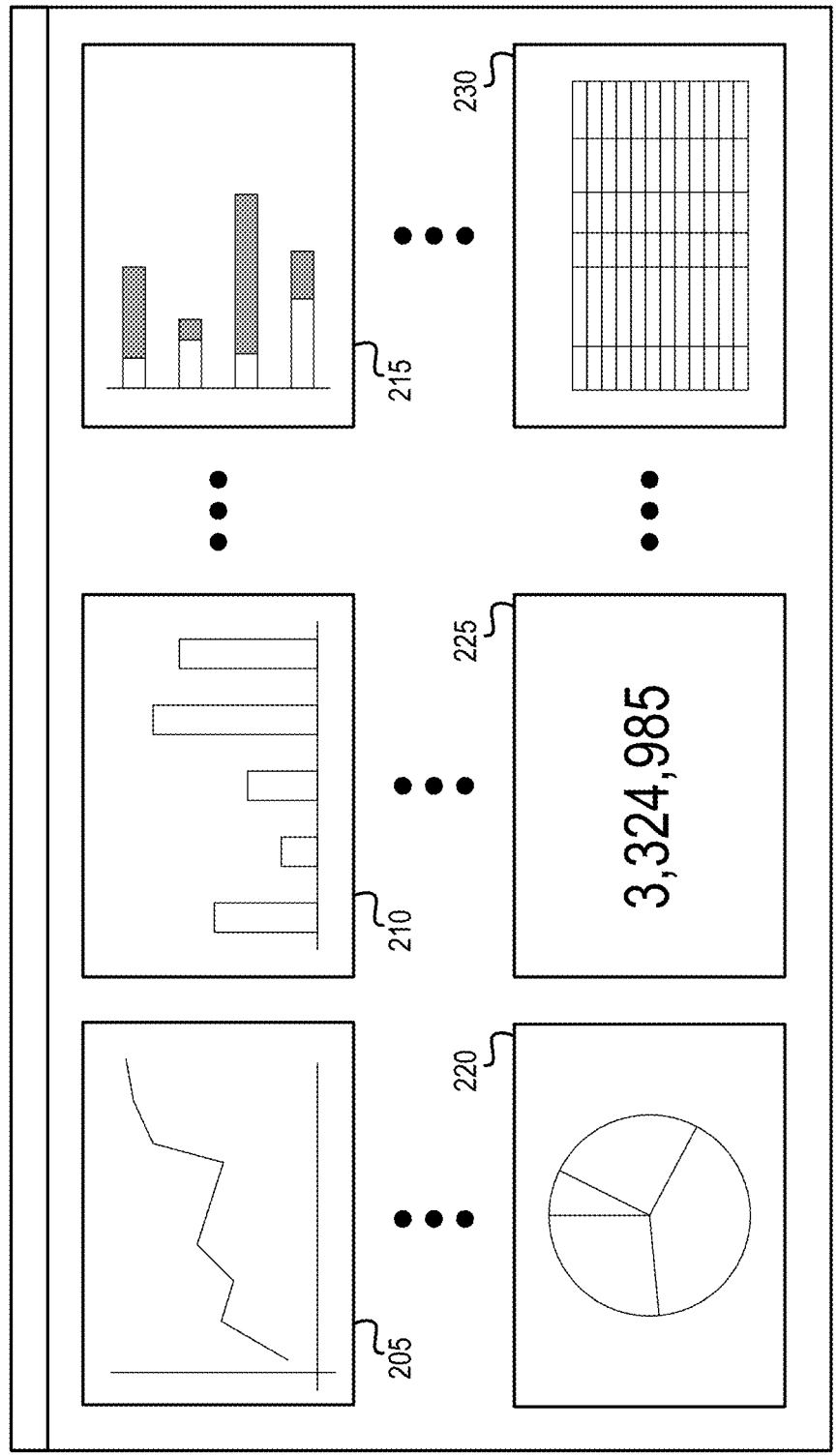
FIG. 2 illustrates an example graphical user interface (GUI) for providing visualizations according to some embodiments.

FIG. 2 illustrates an example GUI 200 for providing visualizations according to some embodiments. As illustrated, GUI 200 includes a number of different visualizations. For instance, visualizations 205-220 includes different types of chart visualizations. Specifically, visualization 205 includes a line chart visualization, visualization 210 is a vertical bar chart visualization, visualization 215 includes a horizontal bar chart visualization, and visualization 220 includes a pie chart visualization. Visualization 225 includes a numeric value. Visualization 230 includes a table visualization.

Returning to FIG. 1, data manager 115 is configured to manage data for visualizations. For example, data manager 115 manages all the data available in a GUI of visualizations. As mentioned above, a UI definition defines the set of visualizations in the GUI. In some cases, a UI definition also defines a set of data models for a GUI. In some embodiments, a data model specifies a set of data that is organized according to measures and dimensions. In some such embodiments, a measure is a field that is configured to store quantitative (e.g., numeric) data whereas a dimension is a field that is configured to store qualitative data. Values stored in a measure can be referred to as measure values and values stored in dimensions can be referred to as dimension values. In some embodiments, a dimension is configured to categorize measures based on the dimension values of the dimension. In some cases, data manager 115 can receive requests for certain or all measures and/or dimensions in a particular data model. In response to the request, data manager 115 sends the requested measures and/or dimensions to UI manager 110.

Data manager 115 may also manage shared objects, which can specify data to be used by visualizations. For instance, data manager 115 can receive a shared object from UI manager 110. In response, data manager 115 stores the shared object in shared object definitions storage 125. In other instances, data manager may receive modifications to shared objects from UI manager 110. In response to receiving a modification to a shared object from UI manager 110, data manager 115 updates the shared object in shared object definitions storage 125 with the modification.

Each of the object consumers 120*a-n* is configured to manage a query model for a corresponding visualization (e.g., visualization 205, visualization 210, visualization 215, visualization 220, visualization 225, or visualization 230). In some embodiments, a query model represents a query for data for a corresponding visualization. A visualization can specify a set of measures and/or dimensions in a data model to use. A query model managed by an object consumer 120 associated with the visualization represents a query for the specified set of measures and/or dimensions. In some instances, a query model managed by an object consumer 120 associated with a visualization can include a reference to a shared object that specify data to be used for the visualization. In some such instances, query models managed by different object consumers 120 associated with different visualizations can include references to the same shared object.

Figure 3:
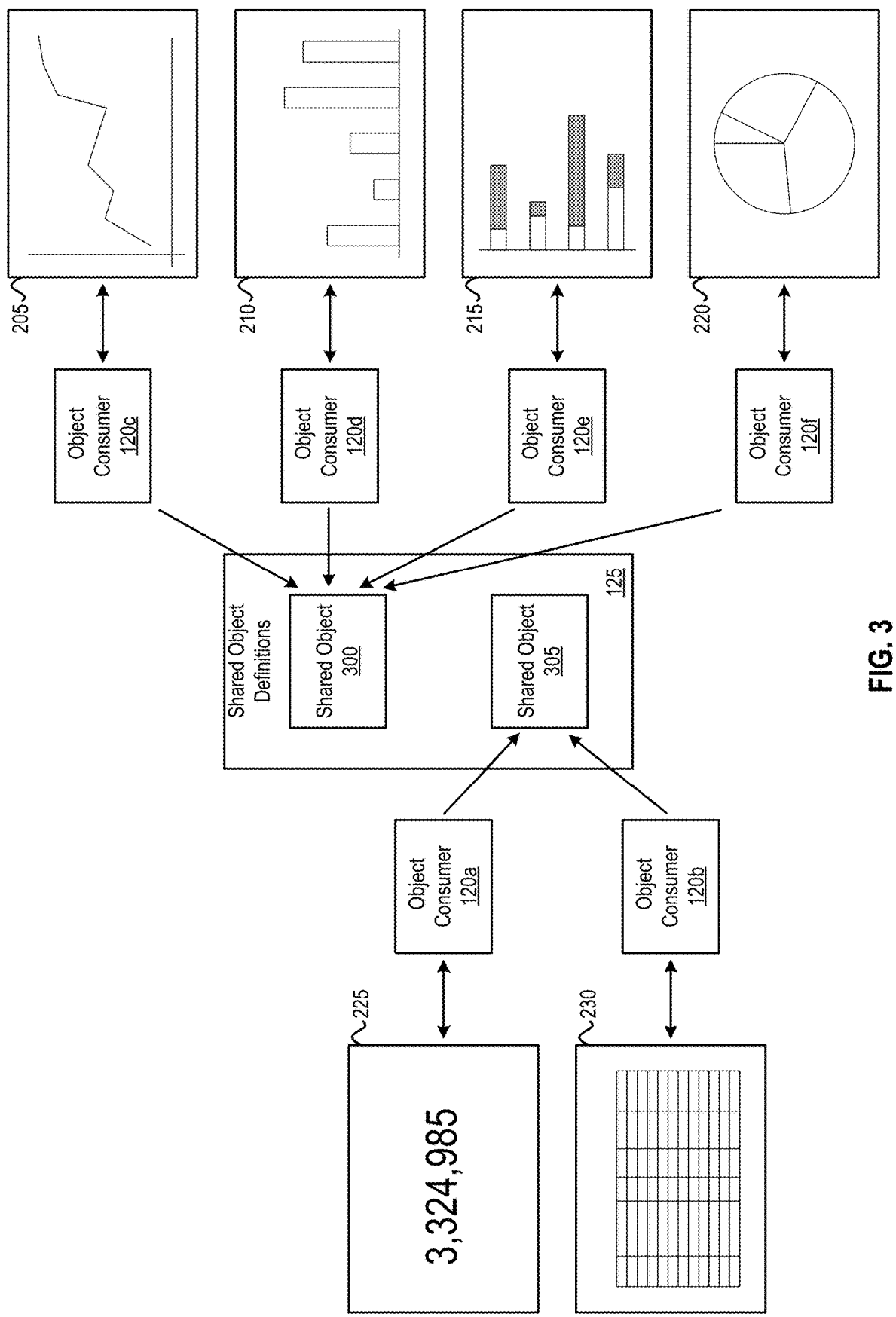
FIG. 3 illustrates an example of visualizations using shared objects according to some embodiments.

FIG. 3 illustrates an example of visualizations using shared objects according to some embodiments. As shown, FIG. 3 includes visualizations 205-230, object consumers 120*a-f*, and shared object definitions storage 125. In this example, UI manager 110 has generated an object consumer 120 for each of the visualizations 205-230. In particular, UI manager 110 generated object consumer 120*a* for visualization 225, object consumer 120*b* for visualization 230, object consumer 120*c* for visualization 205, object consumer 120*d* for visualization 210, object consumer 130*e* for visualization 215, and object consumer 120*f* for visualization 220. As depicted in FIG. 3, shared object definitions storage 125 includes shared object 305 and shared object 300. For this example, the query model managed by object consumer 120*a* and the query model managed by object consumer 120*b* each includes a reference to shared object 305, as indicated by arrows pointing from object consumers 120*a* and 120*b* to shared object 305. In addition the query model managed by object consumer 120*c*, the query model managed by object consumer 120*d*, the query model managed by object consumer 120*e*, and the query model managed by object consumer 120*f* each includes a reference to shared object 300, as indicated by arrows pointing from object consumers 120*c*-120*f* to shared object 300.

Figure 4A:
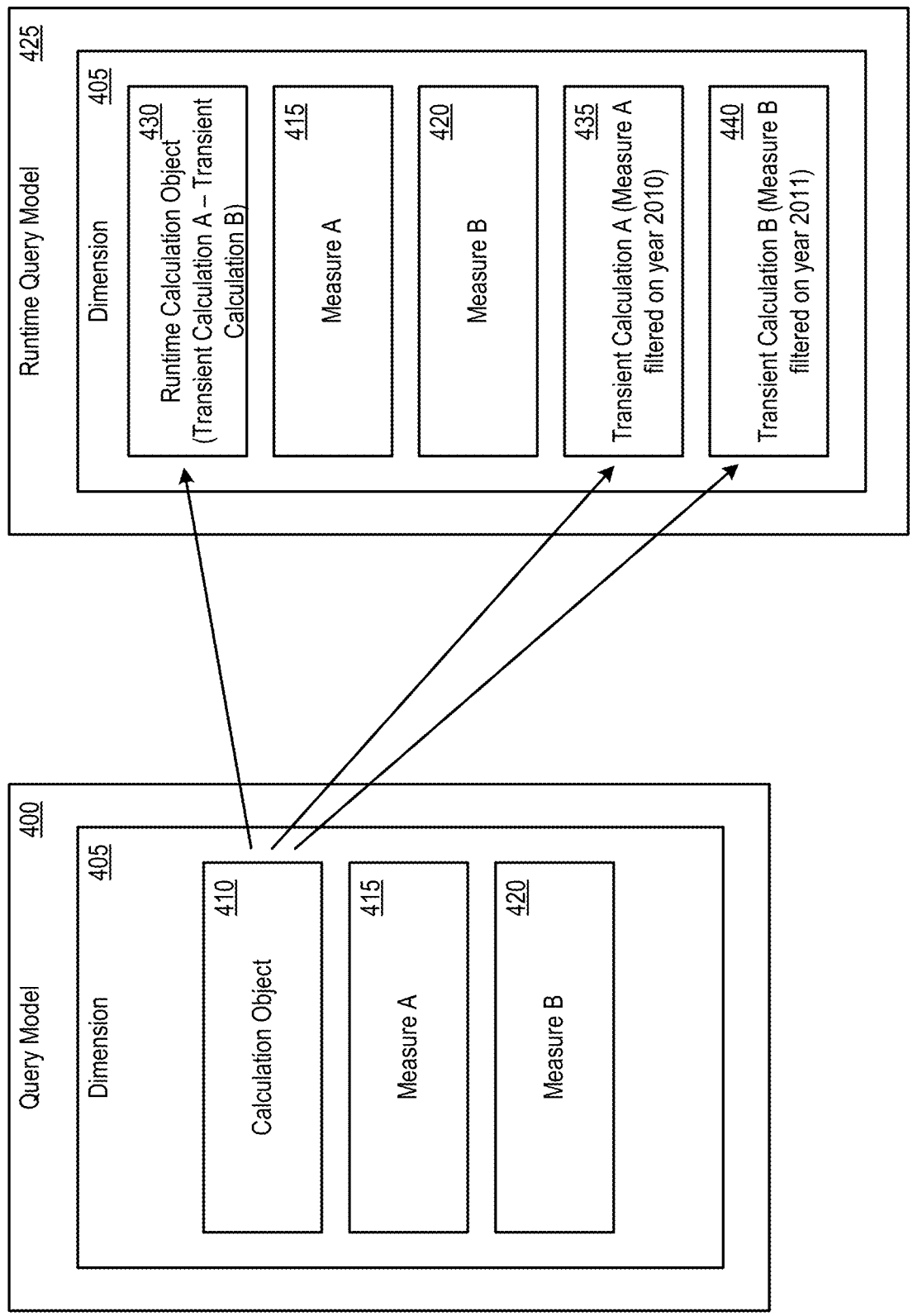
FIGS. 4A and 4B illustrate examples of transforming a query model into a runtime version of the query model according to some embodiments.
Figure 4B:
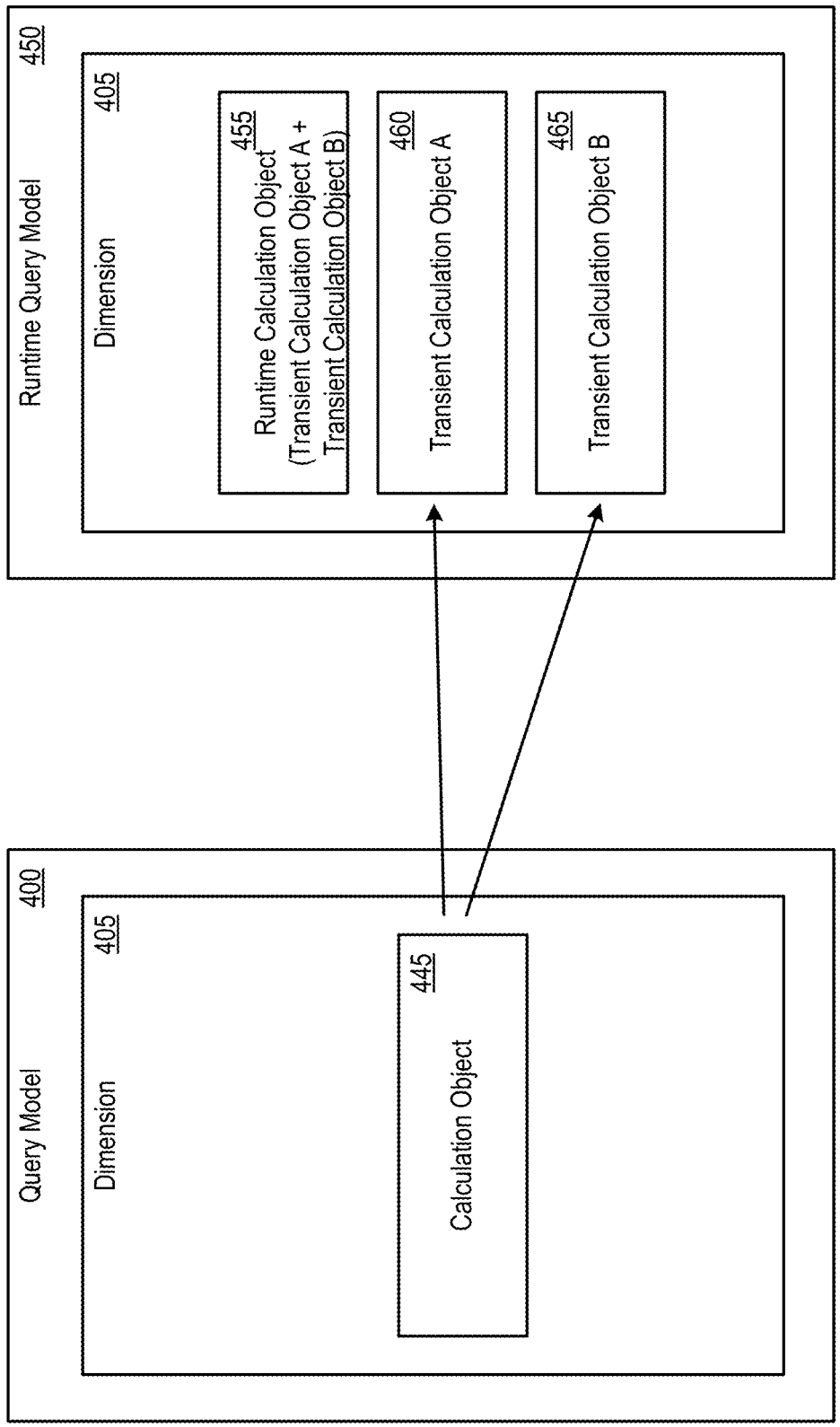

Returning to FIG. 1, each of the object consumers 120 may provide data for its corresponding visualization by executing its query model. In some embodiments, an object consumer 120 executes its query model by transforming the query model into a runtime version of the query model. FIGS. 4A and 4B illustrate examples of transforming a query model into a runtime version of the query model according to some embodiments. Specifically, FIG. 4A illustrates an example of transforming a query model that includes a shared object into a runtime version of the query model according to some embodiments. FIG. 4A shows query model 400 transformed into runtime query model 425, which is a runtime version of query model 400. As illustrated, query model 400 includes dimension 405. In this example, dimension 405 is a dimension in a data model managed by computing system 130. Dimension 405 includes a reference to calculation object 410. Here, calculation object 410 defines a measure whose values are derived from two measures, measure A and measure B, in a data model managed by computing system 130. In particular, calculation object 410 defines a measure whose value is a variance on year between measure A and measure B. That is, the value of the measure defined by calculation object 410 is the difference between measure A filtered on year 2010 and measure B filtered on year 2011 (i.e., measure A filtered on year 2010—measure B filtered on year 2011). As such, dimension 405 includes measures 415 and 420 that represent measure A and measure B, respectively. When an object consumer 120 executes query model 400, the object consumer 120 starts transforming query model 400 into runtime query model 425. First, the object consumer 120 uses the reference to calculation object 410 to retrieve it (e.g., from shared object definitions storage 125). Next, the object consumer 120 generates runtime calculation object 430, which is a runtime version of calculation object 410. In some embodiments, a consumer object 120 generates transient objects for a runtime query model when a calculation object is based on intermediate calculations. Here, measures A and B have filters specified for them and, thus, requires intermediate calculations to determine values for the measures. Therefore, for this example, the object consumer 120 generates transient calculation objects 435 and 440 for measures 415 and 420, respectively. As shown, transient calculation object 435 represents measure A filtered on year 2010 and transient calculation object 440 represents measure B filtered on year 2011. In addition, runtime calculation model 415 represents the difference between the calculations represented by transient calculation objects 435 and 440. As explained above, filters are specified for each of the measures A and B in this example. If no filters are specified for measures A and B, the object consumer 120 would not need to generate transient calculation objects 435 and 440 for runtime query model 425.

FIG. 4B illustrates another example of transforming a query model that includes a shared object into a runtime version of the query model according to some embodiments. As illustrated in FIG. 4B, query model 400 is transformed into runtime query model 450, which is a runtime version of query model 400. Here, query model 400 also includes dimension 405. However, for this example, dimension 405 includes a reference to calculation object 445, which defines a measure whose values are derived from two other calculation objects. Specifically, calculation object 410 defines a measure whose value is the sum between calculation object A and calculation object B. When an object consumer 120 executes query model 400 shown in FIG. 4B, the object consumer 120 begins transforming query model 400 into runtime query model 450 by using the reference to calculation object 445 to retrieve it (e.g., from shared object definitions storage 125). The object consumer 120 then generates runtime calculation object 455, which is a runtime version of calculation object 445. In some embodiments, a consumer object 120 generates transient objects for a runtime query model when a calculation object depends on other calculation objects. In this example, calculation object 445 depends on calculation object A and calculation object B. Hence, the object consumer 120 generates transient calculation objects 460 and 465 for calculation objects A and B, respectively. As depicted in FIG. 4B, runtime calculation model 455 represents the sum of transient calculation objects 460 and 465.

In some cases, an object consumer 120 can serialize its query model and store it in a storage for later use. For example, this may occur when a GUI, which includes a visualization for which the query model is used to provide data, is closed. To serialize a query model that includes a reference to a shared object, an object consumer 120 may generate a set of references (e.g., a storage identifier (ID), a group ID, and an object ID) for the shared object. Instead of including the shared object in the serialized query model, the object consumer 120 includes the set of generated references. When an object consumer 120 deserializes this serialized query model (e.g., a GUI, which includes a visualization for which the query model is used to provide data, is opened), the object consumer 120 uses the set of references to identify the shared object in shared object definitions storage 125. Then, the object consumer 120 generates a reference to the identified shared object and includes the reference in the deserialized query model.

Referring back to FIG. 1, computing system 130 includes application 135, query processor 140, and application data storage 145. Application data storage 145 stores data associated with application 135 such, for example, as data models, UI definition, etc. As mentioned above, a data model specifies a set of data that is organized according to measures and dimensions. In some embodiments, application data storage 145 is implemented in a single physical storage while, in other embodiments, application data storage 145 may be implemented across several physical storages. While FIG. 1 shows application data storage 145 as part of computing system 130, one of ordinary skill in the art will appreciate that application data storage 145 may be external to computing system 130 in some embodiments.

Application 135 is a software application operating on computing system 130 configured to interact with client device 105. For example, application 135 may receive a request for a UI definition from client device 105. In response to the request, application 135 retrieves the UI definition from application data storage 145 and sends it to client device 105. As another example, application 135 can receive a query model (e.g., runtime query model 425) from client device 105. Upon receiving the query model, application 135 forwards it to query processor 140. After receiving the requested data from query processor 140, application 135 forwards it to client device 105.

Query processor 140 is responsible for processing queries represented by query models. For example, query processor 140 may receive a query model from application 135. In response, query processor executes the query represented by the query model by accessing application data storage 145 and retrieving the data specified in the query. In cases where the query model includes a calculation object, query processor 140 derives data from data in the specified data model based on the calculation object. In cases where the query model includes a threshold object, query processor 140 flags values based on the set of rules specified in the threshold object. Once query processor 140 finishes executing the query, query processor 140 sends application 135 the retrieved data, generated data, and/or flagged data.

Figure 5:
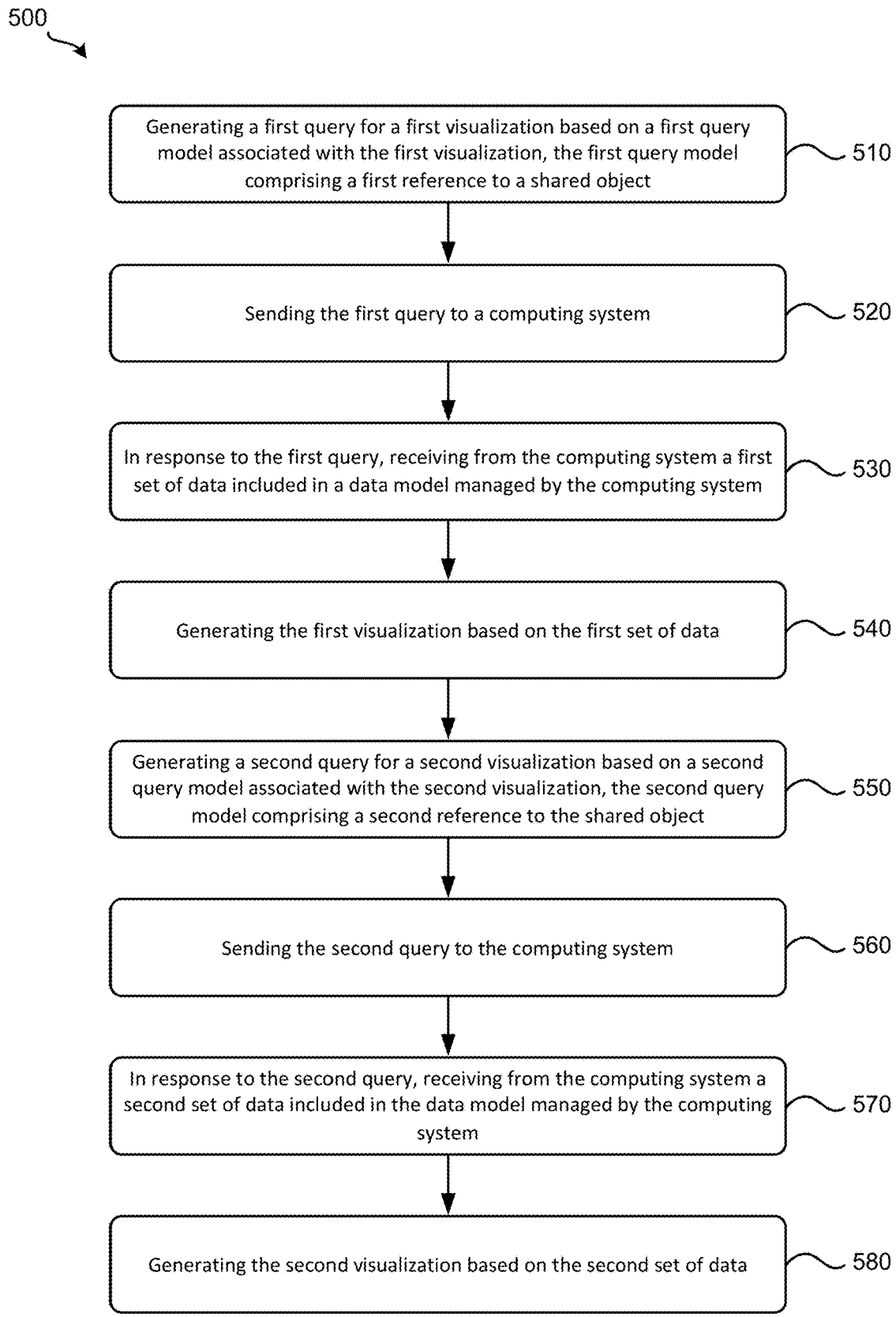
FIG. 5 illustrates a process for generating visualizations based on shared objects according to some embodiments.

FIG. 5 illustrates a process 500 for generating visualizations based on shared objects according to some embodiments. In some embodiments, client device 105 performs process 500. Process 500 begins by generating, at 510, a first query for a first visualization based on a first query model associated with the first visualization, the first query model comprising a first reference to a shared object. Referring to FIGS. 1-4 as an example, object consumer 120a may generate a first query for visualization 225 based on its query model, which includes a reference to shared object 305. The first query can be a runtime version of the query model generated in the same or similar manner as the one described above by reference to FIGS. 4A and 4B.

Next, process 500 sends, at 520, the first query to a computing system. Referring to FIGS. 1 and 3 as an example, object consumer 120a sends the first query to computing system 130. In response to the first query, process 500 receives, at 530, from the computing system a first set of data included in a data model managed by the computing system. Referring to FIGS. 1 and 3 as an example, object consumer 120a can receive from computing system 130 data for visualization 225. Then, process 500 generates, at 540, the first visualization based on the first set of data. Referring to FIGS. 1 and 3 as an example, object consumer 120a generates visualization 225.

At 550, process 500 generates a second query for a second visualization based on a second query model associated with the second visualization, the second query model comprising a second reference to the shared object. Referring to FIGS. 1-4 as an example, object consumer 120*b* may generate a second query for visualization 230 based on its query model, which includes a reference to shared object 305. The second query can be a runtime version of the query model generated in the same or similar manner as the one described above by reference to FIGS. 4A and 4B.

Process 500 then sends, at 560, the second query to the computing system. Referring to FIGS. 1 and 3 as an example, object consumer 120*b* sends the second query to computing system 130. In response to the second query, process 500 receives, at 570, from the computing system a second set of data included in the data model managed by the computing system. Referring to FIGS. 1 and 3 as an example, object consumer 120*b* can receive from computing system 130 data for visualization 230. Finally, process 500 generates, at 580, the second visualization based on the second set of data. Referring to FIGS. 1 and 3 as an example, object consumer 120*b* generates visualization 230.

Figure 6:
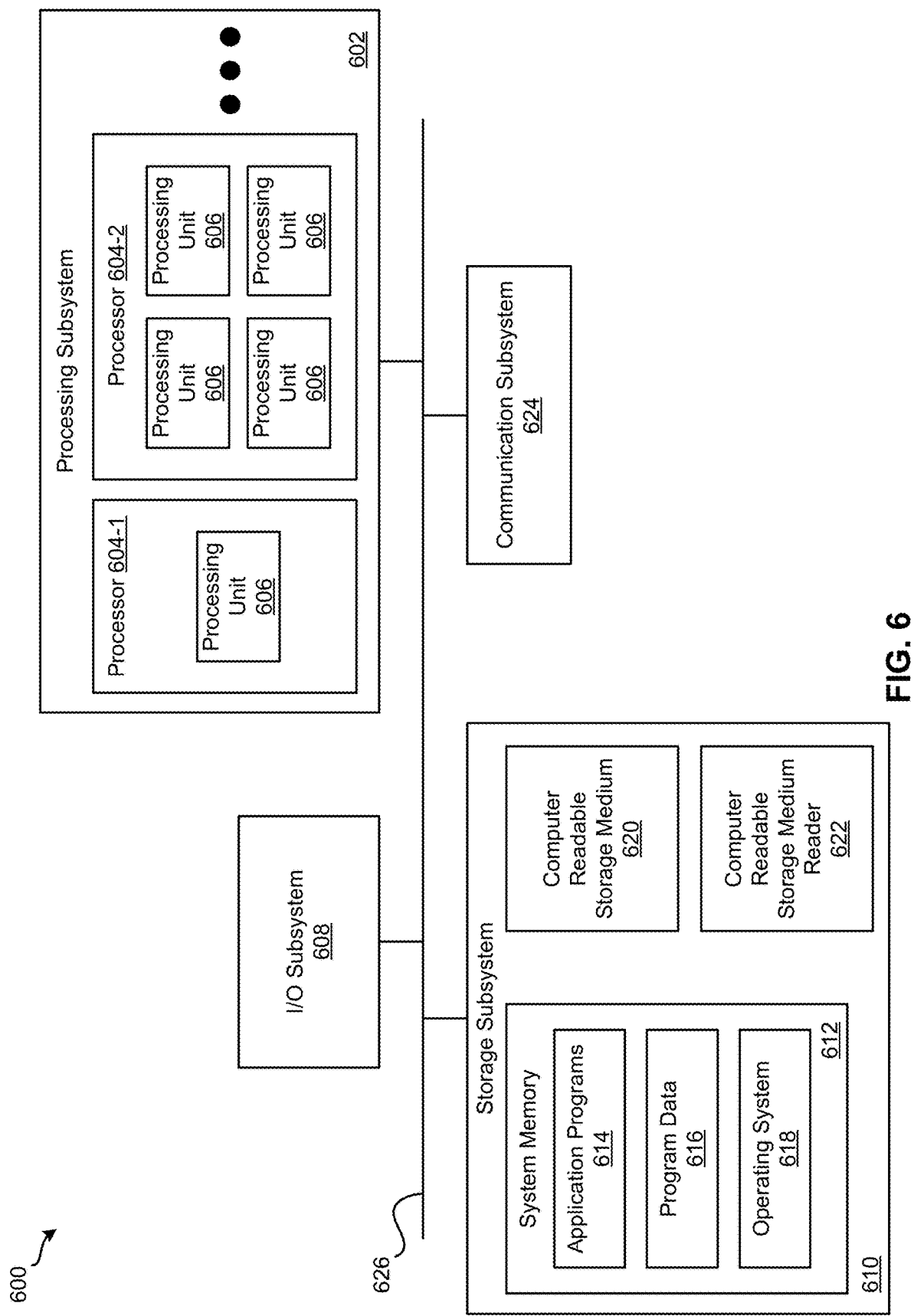
FIG. 6 illustrates an exemplary computer system, in which various embodiments may be implemented.

FIG. 6 illustrates an exemplary computer system 600 for implementing various embodiments described above. For example, computer system 600 may be used to implement client device 105 and computing system 130. Computer system 600 may be a desktop computer, a laptop, a server computer, or any other type of computer system or combination thereof. Some or all elements of UI manager 110, data manager 115, object consumers 120*a-n*, application 135, query manager 140, or combinations thereof can be included or implemented in computer system 600. In addition, computer system 600 can implement many of the operations, methods, and/or processes described above (e.g., process 500). As shown in FIG. 6, computer system 600 includes processing subsystem 602, which communicates, via bus subsystem 626, with input/output (I/O) subsystem 608, storage subsystem 610 and communication subsystem 624.

Bus subsystem 626 is configured to facilitate communication among the various components and subsystems of computer system 600. While bus subsystem 626 is illustrated in FIG. 6 as a single bus, one of ordinary skill in the art will understand that bus subsystem 626 may be implemented as multiple buses. Bus subsystem 626 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 602, which can be implemented as one or more integrated circuits (e.g., a conventional microprocessor or microcontroller), controls the operation of computer system 600. Processing subsystem 602 may include one or more processors 604. Each processor 604 may include one processing unit 606 (e.g., a single core processor such as processor 604-1) or several processing units 606 (e.g., a multicore processor such as processor 604-2). In some embodiments, processors 604 of processing subsystem 602 may be implemented as independent processors while, in other embodiments, processors 604 of processing subsystem 602 may be implemented as multiple processors integrate into a single chip or multiple chips. Still, in some embodiments, processors 604 of processing subsystem 602 may be implemented as a combination of independent processors and multiple processors integrated into a single chip or multiple chips.

In some embodiments, processing subsystem 602 can execute a variety of programs or processes in response to program code and can maintain multiple concurrently executing programs or processes. At any given time, some or all of the program code to be executed can reside in processing subsystem 602 and/or in storage subsystem 610. Through suitable programming, processing subsystem 602 can provide various functionalities, such as the functionalities described above by reference to process 500.

I/O subsystem 608 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 600 to a user or another device (e.g., a printer).

As illustrated in FIG. 6, storage subsystem 610 includes system memory 612, computer-readable storage medium 620, and computer-readable storage medium reader 622. System memory 612 may be configured to store software in the form of program instructions that are loadable and executable by processing subsystem 602 as well as data generated during the execution of program instructions. In some embodiments, system memory 612 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 612 may include different types of memory, such as static random access memory (SRAM) and/or dynamic random access memory (DRAM). System memory 612 may include a basic input/output system (BIOS), in some embodiments, that is configured to store basic routines to facilitate transferring information between elements within computer system 600 (e.g., during start-up). Such a BIOS may be stored in ROM (e.g., a ROM chip), flash memory, or any other type of memory that may be configured to store the BIOS.

As shown in FIG. 6, system memory 612 includes application programs 614 (e.g., application 135), program data 616, and operating system (OS) 618. OS 618 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 620 may be a non-transitory computer-readable medium configured to store software (e.g., programs, code modules, data constructs, instructions, etc.). Many of the components (e.g., UI manager 110, data manager 115, object consumers 120a-n, application 135, and query manager 140) and/or processes (e.g., process 500) described above may be implemented as software that when executed by a processor or processing unit (e.g., a processor or processing unit of processing subsystem 602) performs the operations of such components and/or processes. Storage subsystem 610 may also store data used for, or generated during, the execution of the software.

Storage subsystem 610 may also include computer-readable storage medium reader 622 that is configured to communicate with computer-readable storage medium 620. Together and, optionally, in combination with system memory 612, computer-readable storage medium 620 may comprehensively represent remote, local, fixed, and/or removable storage devices plus storage media for temporarily and/or more permanently containing, storing, transmitting, and retrieving computer-readable information.

Computer-readable storage medium 620 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 624 serves as an interface for receiving data from, and transmitting data to, other devices, computer systems, and networks. For example, communication subsystem 624 may allow computer system 600 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 624 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 624 may provide components configured for wired communication (e.g., Ethernet) in addition to or instead of components configured for wireless communication.

One of ordinary skill in the art will realize that the architecture shown in FIG. 6 is only an example architecture of computer system 600, and that computer system 600 may have additional or fewer components than shown, or a different configuration of components. The various components shown in FIG. 6 may be implemented in hardware, software, firmware or any combination thereof, including one or more signal processing and/or application specific integrated circuits.

Figure 7:
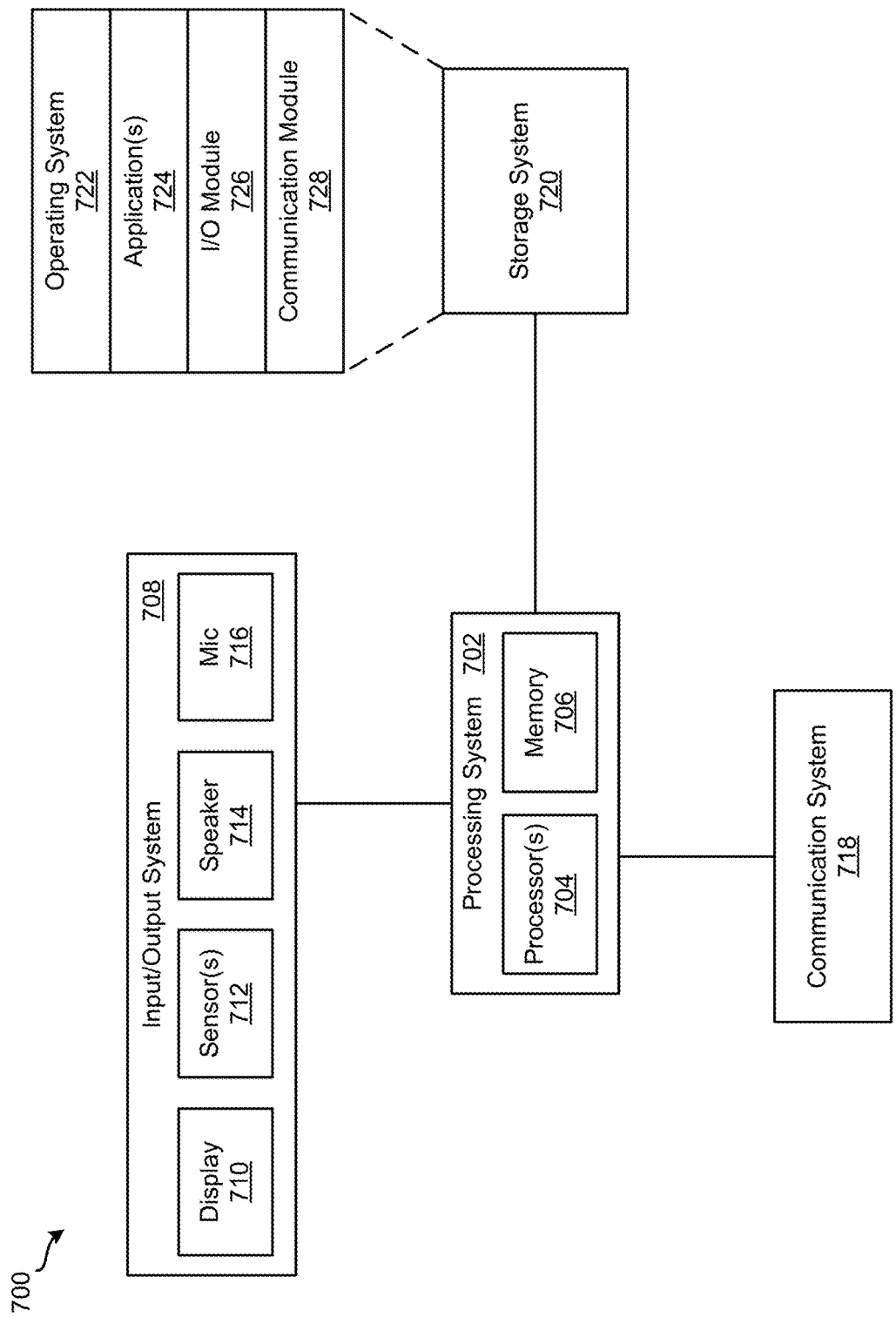
FIG. 7 illustrates an exemplary computing device, in which various embodiments may be implemented.

FIG. 7 illustrates an exemplary computing device 700 for implementing various embodiments described above. For example, computing device 700 may be used to implement client device 105. Computing device 700 may be a cellphone, a smartphone, a wearable device, an activity tracker or manager, a tablet, a personal digital assistant (PDA), a media player, or any other type of mobile computing device or combination thereof. As shown in FIG. 7, computing device 700 includes processing system 702, input/output (I/O) system 708, communication system 718, and storage system 720. These components may be coupled by one or more communication buses or signal lines.

Processing system 702, which can be implemented as one or more integrated circuits (e.g., a conventional microprocessor or microcontroller), controls the operation of computing device 700. As shown, processing system 702 includes one or more processors 704 and memory 706. Processors 704 are configured to run or execute various software and/or sets of instructions stored in memory 706 to perform various functions for computing device 700 and to process data.

Each processor of processors 704 may include one processing unit (e.g., a single core processor) or several processing units (e.g., a multicore processor). In some embodiments, processors 704 of processing system 702 may be implemented as independent processors while, in other embodiments, processors 704 of processing system 702 may be implemented as multiple processors integrate into a single chip. Still, in some embodiments, processors 704 of processing system 702 may be implemented as a combination of independent processors and multiple processors integrated into a single chip.

Memory 706 may be configured to receive and store software (e.g., operating system 722, applications 724, I/O module 726, communication module 728, etc. from storage system 720) in the form of program instructions that are loadable and executable by processors 704 as well as data generated during the execution of program instructions. In some embodiments, memory 706 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 708 is responsible for receiving input through various components and providing output through various components. As shown for this example, I/O system 708 includes display 710, one or more sensors 712, speaker 714, and microphone 716. Display 710 is configured to output visual information (e.g., a graphical user interface (GUI) generated and/or rendered by processors 704). In some embodiments, display 710 is a touch screen that is configured to also receive touch-based input. Display 710 may be implemented using liquid crystal display (LCD) technology, light-emitting diode (LED) technology, organic LED (OLED) technology, organic electro luminescence (OEL) technology, or any other type of display technologies. Sensors 712 may include any number of different types of sensors for measuring a physical quantity (e.g., temperature, force, pressure, acceleration, orientation, light, radiation, etc.). Speaker 714 is configured to output audio information and microphone 716 is configured to receive audio input. One of ordinary skill in the art will appreciate that I/O system 708 may include any number of additional, fewer, and/or different components. For instance, I/O system 708 may include a keypad or keyboard for receiving input, a port for transmitting data, receiving data and/or power, and/or communicating with another device or component, an image capture component for capturing photos and/or videos, etc.

Communication system 718 serves as an interface for receiving data from, and transmitting data to, other devices, computer systems, and networks. For example, communication system 718 may allow computing device 700 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 718 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 718 may provide components configured for wired communication (e.g., Ethernet) in addition to or instead of components configured for wireless communication.

Storage system 720 handles the storage and management of data for computing device 700. Storage system 720 may be implemented by one or more non-transitory machine-readable mediums that are configured to store software (e.g., programs, code modules, data constructs, instructions, etc.) and store data used for, or generated during, the execution of the software.

In this example, storage system 720 includes operating system 722, one or more applications 724, I/O module 726, and communication module 728. Operating system 722 includes various procedures, sets of instructions, software components and/or drivers for controlling and managing general system tasks (e.g., memory management, storage device control, power management, etc.) and facilitates communication between various hardware and software components. Operating system 722 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 724 can include any number of different applications installed on computing device 700. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 726 manages information received via input components (e.g., display 710, sensors 712, and microphone 716) and information to be outputted via output components (e.g., display 710 and speaker 714). Communication module 728 facilitates communication with other devices via communication system 718 and includes various software components for handling data received from communication system 718.

One of ordinary skill in the art will realize that the architecture shown in FIG. 7 is only an example architecture of computing device 700, and that computing device 700 may have additional or fewer components than shown, or a different configuration of components. The various components shown in FIG. 7 may be implemented in hardware, software, firmware or any combination thereof, including one or more signal processing and/or application specific integrated circuits.

Figure 8:
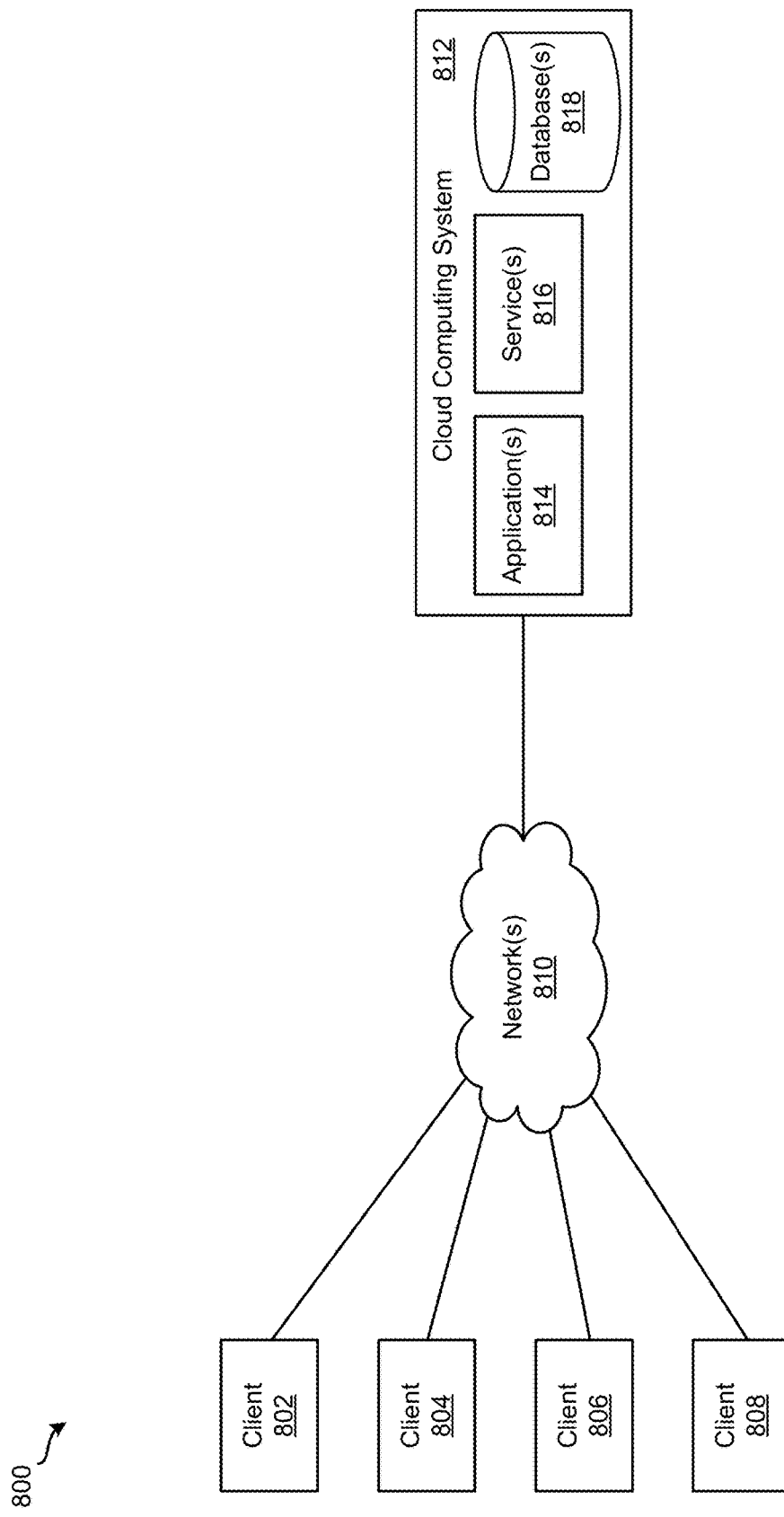
FIG. 8 illustrates an exemplary system, in which various embodiments may be implemented.

FIG. 8 illustrates an exemplary system 800 for implementing various embodiments described above. For example, one of the client devices 802-808 may be used to implement client device 105 and cloud computing system may be used to implement computing system 135. As shown, system 800 includes client devices 802-808, one or more networks 810, and cloud computing system 812. Cloud computing system 812 is configured to provide resources and data to client devices 802-808 via networks 810. In some embodiments, cloud computing system 800 provides resources to any number of different users (e.g., customers, tenants, organizations, etc.). Cloud computing system 812 may be implemented by one or more computer systems (e.g., servers), virtual machines operating on a computer system, or a combination thereof.

As shown, cloud computing system 812 includes one or more applications 814, one or more services 816, and one or more databases 818. Cloud computing system 800 may provide applications 814, services 816, and databases 818 to any number of different customers in a self-service, subscription-based, elastically scalable, reliable, highly available, and secure manner.

In some embodiments, cloud computing system 800 may be adapted to automatically provision, manage, and track a customer's subscriptions to services offered by cloud computing system 800. Cloud computing system 800 may provide cloud services via different deployment models. For example, cloud services may be provided under a public cloud model in which cloud computing system 800 is owned by an organization selling cloud services and the cloud services are made available to the general public or different industry enterprises. As another example, cloud services may be provided under a private cloud model in which cloud computing system 800 is operated solely for a single organization and may provide cloud services for one or more entities within the organization. The cloud services may also be provided under a community cloud model in which cloud computing system 800 and the cloud services provided by cloud computing system 800 are shared by several organizations in a related community. The cloud services may also be provided under a hybrid cloud model, which is a combination of two or more of the aforementioned different models.

In some instances, any one of applications 814, services 816, and databases 818 made available to client devices 802-808 via networks 810 from cloud computing system 812 is referred to as a "cloud service." Typically, servers and systems that make up cloud computing system 812 are different from the on-premises servers and systems of a customer. For example, cloud computing system 812 may host an application and a user of one of client devices 802-808 may order and use the application via networks 810.

Applications 814 may include software applications that are configured to execute on cloud computing system 812 (e.g., a computer system or a virtual machine operating on a computer system) and be accessed, controlled, managed, etc. via client devices 802-808. In some embodiments, applications 814 may include server applications and/or mid-tier applications (e.g., HTTP (hypertext transport protocol) server applications, FTP (file transfer protocol) server applications, CGI (common gateway interface) server applications, JAVA server applications, etc.). Services 816 are software components, modules, application, etc. that are configured to execute on cloud computing system 812 and provide functionalities to client devices 802-808 via networks 810. Services 816 may be web-based services or on-demand cloud services.

Databases 818 are configured to store and/or manage data that is accessed by applications 814, services 816, and/or client devices 802-808. For instance, storage 145 may be stored in databases 818. Databases 818 may reside on a non-transitory storage medium local to (and/or resident in) cloud computing system 812, in a storage-area network (SAN), on a non-transitory storage medium local located remotely from cloud computing system 812. In some embodiments, databases 818 may include relational databases that are managed by a relational database management system (RDBMS). Databases 818 may be a column-oriented databases, row-oriented databases, or a combination thereof. In some embodiments, some or all of databases 818 are in-memory databases. That is, in some such embodiments, data for databases 818 are stored and managed in memory (e.g., random access memory (RAM)).

Client devices 802-808 are configured to execute and operate a client application (e.g., a web browser, a proprietary client application, etc.) that communicates with applications 814, services 816, and/or databases 818 via networks 810. This way, client devices 802-808 may access the various functionalities provided by applications 814, services 816, and databases 818 while applications 814, services 816, and databases 818 are operating (e.g., hosted) on cloud computing system 800. Client devices 802-808 may be computer system 600 or computing device 700, as described above by reference to FIGS. 6 and 7, respectively. Although system 800 is shown with four client devices, any number of client devices may be supported.

Networks 810 may be any type of network configured to facilitate data communications among client devices 802-808 and cloud computing system 812 using any of a variety of network protocols. Networks 810 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a device, the program comprising sets of instructions for:
    generating a first query for a first set of data corresponding to a first visualization based on a first query model associated with the first visualization, the first query model comprising a first reference to a shared object, wherein the shared object specifies the first set of data to be used in the first visualization;
    sending the first query to a computing system;
    in response to the first query, receiving from the computing system the first set of data, wherein the first set of data is included in a data model managed by the computing system;
    generating the first visualization based on the first set of data;
    generating a second query for a second set of data corresponding to a second visualization based on a second query model associated with the second visualization, the second query model comprising a second reference to the shared object, wherein the shared object further specifies the second set of data to be used in the second visualization;
    sending the second query to the computing system;
    in response to the second query, receiving from the computing system the second set of data included in the data model managed by the computing system; and
    generating the second visualization based on the second set of data,
    wherein the first query model represents a first query for data for a first associated visualization and comprises one or more dimensions corresponding to dimensions in the first associated visualization, wherein the second query model represents a second query for data for a second associated visualization and comprises one or more dimensions corresponding to dimensions in the second associated visualization, and wherein the first query model and the second query model are different query models associated with different visualizations.

2. The non-transitory machine-readable medium of claim 1, wherein generating the first query comprises transforming the first query model into a runtime version of the first query model.

3. The non-transitory machine-readable medium of claim 2, wherein transforming the first query model into the runtime version of the first query model comprises:
    based on the first reference, retrieving the shared object; and
    generating a set of transient objects based on the shared object, wherein sending the first query to the computing system comprises sending the runtime version of the first query model to the computing system.

4. The non-transitory machine-readable medium of claim 1, wherein the program further comprises sets of instructions for:
    providing a graphical user interface (GUI) for defining shared objects; and
    receiving, through the GUI, a definition of the shared object.

5. The non-transitory machine-readable medium of claim 1, wherein the program further comprises sets of instructions for serializing the first query model for storage by converting the first query model into a format configured to be stored in a storage.

6. The non-transitory machine-readable medium of claim 5, wherein converting the first query model comprises determining a set of identifiers (IDs) for collectively identifying the shared object model and including the set of IDs in the first query model formatted according to the format.

7. The non-transitory machine-readable medium of claim 1, wherein the shared object is a calculation object configured to derive data based on data included in the data model.

8. A method comprising:
generating a first query for a first set of data corresponding to a first visualization based on a first query model associated with the first visualization, the first query model comprising a first reference to a shared object, wherein the shared object specifies the first set of data to be used in the first visualization;
sending the first query to a computing system;
in response to the first query, receiving from the computing system the first set of data, wherein the first set of data is included in a data model managed by the computing system;
generating the first visualization based on the first set of data;
generating a second query for a second set of data corresponding to a second visualization based on a second query model associated with the second visualization, the second query model comprising a second reference to the shared object, wherein the shared object further specifies the second set of data to be used in the second visualization;
sending the second query to the computing system;
in response to the second query, receiving from the computing system the second set of data included in the data model managed by the computing system; and
generating the second visualization based on the second set of data,
wherein the first query model represents a first query for data for a first associated visualization and comprises one or more dimensions corresponding to dimensions in the first associated visualization, wherein the second query model represents a second query for data for a second associated visualization and comprises one or more dimensions corresponding to dimensions in the second associated visualization, and wherein the first query model and the second query model are different query models associated with different visualizations.

9. The method of claim 8, wherein generating the first query comprises transforming the first query model into a runtime version of the first query model.

10. The method of claim 9, wherein transforming the first query model into the runtime version of the first query model comprises:
based on the first reference, retrieving the shared object; and
generating a set of transient objects based on the shared object, wherein sending the first query to the computing system comprises sending the runtime version of the first query model to the computing system.

11. The method of claim 8 further comprising:
providing a graphical user interface (GUI) for defining shared objects; and
receiving, through the GUI, a definition of the shared object.

12. The method of claim 8 further comprising serializing the first query model for storage by converting the first query model into a format configured to be stored in a storage.

13. The method of claim 12, wherein converting the first query model comprises determining a set of identifiers (IDs) for collectively identifying the shared object model and including the set of IDs in the first query model formatted according to the format.

14. The method of claim 8, wherein the shared object is a calculation object configured to derive data based on data included in the data model.

15. A system comprising:
a set of processing units; and
a non-transitory machine-readable medium storing instructions that when executed by at least one processing unit in the set of processing units cause the at least one processing unit to:
generate a first query for a first set of data corresponding to a first visualization based on a first query model associated with the first visualization, the first query model comprising a first reference to a shared object, wherein the shared object specifies the first set of data to be used in the first visualization;
send the first query to a computing system;
in response to the first query, receive from the computing system the first set of data, wherein the first set of data is included in a data model managed by the computing system;
generate the first visualization based on the first set of data;
generate a second query for a second set of data corresponding to a second visualization based on a second query model associated with the second visualization, the second query model comprising a second reference to the shared object, wherein the shared object further specifies the second set of data to be used in the second visualization;
send the second query to the computing system;
in response to the second query, receive from the computing system the second set of data included in the data model managed by the computing system; and
generate the second visualization based on the second set of data,
wherein the first query model represents a first query for data for a first associated visualization and comprises one or more dimensions corresponding to dimensions in the first associated visualization, wherein the second query model represents a second query for data for a second associated visualization and comprises one or more dimensions corresponding to dimensions in the second associated visualization, and wherein the first query model and the second query model are different query models associated with different visualizations.

16. The system of claim 15, wherein generating the first query comprises transforming the first query model into a runtime version of the first query model.

17. The system of claim 16, wherein transforming the first query model into the runtime version of the first query model comprises:
based on the first reference, retrieving the shared object; and
generating a set of transient objects based on the shared object, wherein sending the first query to the computing system comprises sending the runtime version of the first query model to the computing system.

18. The system of claim 15, wherein the instructions further cause the at least one processing unit to:
provide a graphical user interface (GUI) for defining shared objects; and
receive, through the GUI, a definition of the shared object.

19. The system of claim 15, wherein the instructions further cause the at least one processing unit to serialize the first query model for storage by converting the first query model into a format configured to be stored in a storage.

20. The system of claim 19, wherein converting the first query model comprises determining a set of identifiers (IDs)

for collectively identifying the shared object model and including the set of IDs in the first query model formatted according to the format.

* * * * *